US007120880B1

(12) United States Patent
Dryer et al.

(10) Patent No.: US 7,120,880 B1
(45) Date of Patent: Oct. 10, 2006

(54) METHOD AND SYSTEM FOR REAL-TIME DETERMINATION OF A SUBJECT'S INTEREST LEVEL TO MEDIA CONTENT

(75) Inventors: D. Christopher Dryer, Mountain View, CA (US); Myron Dale Flickner, San Jose, CA (US); Jianchang Mao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/257,208

(22) Filed: Feb. 25, 1999

(51) Int. Cl.
*G06F 17/00* (2006.01)

(52) U.S. Cl. ...................... 715/863; 715/831

(58) Field of Classification Search ............. 715/863, 715/701, 702, 709, 710, 831, 744–747, 962, 715/966, 771–773, 811, 789; 345/802, 774, 345/801, 863, 856–862, 708–714, 771–773, 345/811, 744, 747, 789; 600/544; 705/35, 705/10; 707/1, 2, 5; 704/270, 275
See application file for complete search history.

(56) References Cited

U.S. PATENT DOCUMENTS

| 4,950,069 | A | | 8/1990 | Hutchinson |
|---|---|---|---|---|
| 5,802,220 | A | * | 9/1998 | Black et al. ............... 382/276 |
| 5,825,355 | A | | 10/1998 | Palmer et al. |
| 5,886,683 | A | | 3/1999 | Tognazzini et al. |
| 5,898,423 | A | | 4/1999 | Tognazzini et al. |
| 5,920,477 | A | | 7/1999 | Hoffberg et al. |
| 5,959,621 | A | | 9/1999 | Nawaz et al. |
| 5,983,129 | A | * | 11/1999 | Cowan et al. .............. 600/544 |
| 5,987,415 | A | * | 11/1999 | Breese et al. ............... 704/270 |
| 6,056,781 | A | * | 5/2000 | Wassick et al. .............. 703/12 |
| 6,067,565 | A | | 5/2000 | Horvitz |
| 6,134,644 | A | | 10/2000 | Mayuzumi et al. |
| 6,182,098 | B1 | | 1/2001 | Selker |
| 6,185,534 | B1 | * | 2/2001 | Breese et al. ............... 704/270 |
| 6,195,651 | B1 | * | 2/2001 | Handel et al. ............... 707/2 |
| 6,212,502 | B1 | * | 4/2001 | Ball et al. .................. 704/270 |
| 6,349,290 | B1 | * | 2/2002 | Horowitz et al. ............. 705/35 |
| 6,437,758 | B1 | * | 8/2002 | Nielsen et al. ................ 345/8 |
| 6,577,329 | B1 | * | 6/2003 | Flickner et al. ............. 715/774 |
| 2002/0182574 | A1 | * | 12/2002 | Freer .......................... 434/236 |
| 2003/0037041 | A1 | * | 2/2003 | Hertz ........................... 707/1 |

OTHER PUBLICATIONS

Lisetti, et al, "An Environment to Acknowledge the Interface between Affect and Cognition", pp. 78-86.

Black, et al., "Recognizing Facial Expressions in Image Sequences using Local Parameterized Models of Image Motion", pp. 1-35, Mar. 1995.

Malcolm Slaney and Gerald McRoberts, "Baby Ears: A Recognition System for Affective Vocalizations", Proceedings of the 1998 International Conference on Acoustics, Speech, and Signal Processing (ICASSP), Seattle, WA, May 12-15, 1998, pp. 1-4.

Lien, et al, "Automatically Recognizing Facial Expressions in the Spatio-Temporal Domain", Oct. 19-21, 1997, Workshop on Perceptual User Interfaces, pp. 94-97, Banff, Alberta, Canada.

(Continued)

*Primary Examiner*—Steven P. Sax
(74) *Attorney, Agent, or Firm*—Daniel E. Johnson; McGinn IP Law Group, PLLC

(57) ABSTRACT

A system and method for unobtrusively detecting a subject's level of interest in media content, includes detecting to what a subject is attending, measuring a subject's relative arousal level; and combining information regarding the subject's arousal level and attention to infer a level of interest.

67 Claims, 3 Drawing Sheets

OTHER PUBLICATIONS

Lien, et al., "Subtly Different Facial Expression Recognition And Expression Intensity Estimation", Jun. 1998, IEEE, Published in the Proceedings of CVPR'98, Santa Barbara, CA.

Lien, et al, "Automated Facial Expression Recognition Based on FACS Action Units", April 14-16, 1998, IEEE, Published in the Proceedings of FG '98, Nara, Japan.

Morimoto, et al., "Pupil Detection and Tracking Using Multiple Light Sources".

Ebisawa, et al, "Examination of Eye-Gaze Detection Technique Using Two Light Sources and the Image Difference Method", SICE '94, Jul. 26-28, 1994.

Ebisawa, Y., "Improved Video-Based Eye-Gaze Detection Method", IMTC '94 May 10-12, 1994.

Ohtani, et al., "Eye-Gaze Detection Based on the Pupil Detection Technique Using Two Light Sources and the Image Difference Method", Sep. 20-23, 1995, pp. 1623-1624.

Y. Ebisawa, "Unconstrained pupil detection technique using two light sources and the image difference method", Visualization and Intelligent Design in Engineering, pp. 79-89.

Kumakura, S., "Apparatus for estimating the drowsiness level of a vehicle driver", Jul. 28, 1998, pp. 1-2.

Eriksson, M., "Eye-Tracking for Detection of Driver Fatigue", IEEE Conference on Intelligent Transportation Systems, Nov. 9-12, 1997, pp. 314-319.

Funada, et al., "On an Image Processing of Eye Blinking to Monitor Awakening Levels of Human Beings", IEEE Conference, pp. 966-967.

Fernandez, et al., "Singal Processing for Recognition of Human Frustration", MIT Media Laboratory Perceptual Computing Section Technical Report No. 447, ICASSP '98, Seatlle, Washington, May 12-15, 1998, pp. 1-4.

Kamitani, et al., "Analysis of perplex situations in word processor work using facial image sequence", SPIE vol. 3016, pp. 324-334.

Tomono, et al., "A TV Camera System Which Extracts Feature Points for Non-Contact Eye Movement Detection", SPIE vol. 1194 Optics, Illumination, and Image Sensing for Machine Vision IV (1989), pp. 2-12.

Pantic, et al., "Automation of Non-Verbal Communication of Facial Expressions", pp. 86-93.

Pantic, et al., "Automated Facial Expression analysis", pp. 194-200.

Morimoto, et al., "Recognition of Head Gestures Using Hidden Markov Models".

H. Rex Hartson and Deborah Hix, "Advances in Human-Computer Interaction", vol. 4, Virginia Polytechnic Institute and State University, ABLEX Publishing Corporation, Norwood, New Jersey, pp. 151-190, May 1993.

Paul P. Maglio, Rob Barrett, Christopher S. Campbell, Ted Selker, IBM Almaden Research Center, San Jose, CA., "SUITOR: An Attentive Information System", IUI2000: The International Conference on Intelligent User Interfaces, pp. 1-8.

Erik D. Reichle, Alexander Pollatsek, Donald L. Fisher, and Keith Rayner, University of Massachusetts at Amherst, "Toward a Model of Eye Movement Control in Reading", Psychological Review 1998, vol. 105, No. 1, pp. 125-157.

Robert J.K. Jacob, Human-Computer Interaction Lab, Naval Research Laboratory, Washington, D.C., "What You Look at is What You Get: Eye Movement-Based Interaction Techniques", CHI '90 Proceedings, Apr. 1990, pp. 11-18.

Johnmarshall Reeve, "The Face of Interest", Motivation and Emotion, vol. 17, No. 4, 1993, pp. 353-375, 12 Pages Total.

Johnmarshall Reeve and Glen Nix, "Expressing Intrinsic Motivation Through Acts of Exploration and Facial Displays of Interest", Motivation and Emotion, vol. 21, No. 3, 1997, pp. 237-250, 8 Pages Total.

* cited by examiner

METHOD AND SYSTEM FOR REAL-TIME DETERMINATION OF A SUBJECT'S INTEREST LEVEL TO MEDIA CONTENT

CROSS-REFERENCE TO RELATED APPLICATION

The present application is related to U.S. patent application Ser. No. 09/257,200, filed on Feb. 25, 1999, to Flickner et al., entitled "METHOD AND SYSTEM FOR RELEVANCE FEEDBACK THROUGH GAZE TRACKING AND TICKER INTERFACES", assigned to the present assignee, and incorporated herein by reference.

BACKGROUND OF THE INVENTION

1. Field of the Invention

The present invention relates to a method and system for determining a subject interest level to media content, and specifically to the level of interest a subject expresses in content of an image on a display. More particularly, the invention relates to a method and system for non-intrusively detecting how interested a subject is to media content (e.g., the content originating from broadcast or cable TV, the web, a computer application, a talk, a classroom lecture, a play, etc.).

2. Description of the Related Art

Information technologies have become quite efficient at data transmission. However, users are not interested in data per se, but instead want data that is useful for a particular task. More specifically, people desire interesting information suited to a particular topic, problem, etc. The importance of providing interesting information in communication has been noted by various philosophers and scientists, including Grice, H. P. Logica and Conversation, in: P. Cole & J. Morgan (Eds.), *Syntax and Semantics* 3: Speech Acts, pp. 41–58, (New York: Academic Press, 1967) who urged that speakers must make their communication relevant to the listener if communication is to be successful.

The problem of determining whether data is interesting to a receiver has been addressed in different ways within different media. In interpersonal communication, a listener provides a speaker with verbal and non-verbal feedback (e.g., cues) that indicates the listener's level of interest.

In many mass media, such as television, multiple channels that offer some variety of information are provided, and people receiving the information select from the available information whatever seems most interesting. Then, people's selections are measured (e.g., typically by sampling a small segment of viewers such as by the Nielsen ratings or the like), so that more interesting and new (potentially interesting) content can be made more available, and content that is not interesting can be made less available.

The interpersonal means of interest level detection has an advantage over the typical mass media means in that in the interpersonal medium, interest level detection occurs in real time, within a single exchange of information rather than between a plurality of exchanges of information. The speaker can introduce information, assess the listener's interest in the information and then consider the listener's interests when presenting subsequent information. Thus, the speaker can tailor the subsequent information depending upon the listener's perceived interest.

Mass media technologies typically rely on less immediate feedback (e.g., again through ratings or the like of a small population sample, oftentimes not proximate to the original presentation of the information). A drawback to this procedure is that people have to search through information, looking for something interesting, only to discover that sometimes none of the available information is interesting. Currently, there are no methods or systems for assessing and communicating a person's level of interest by passively observing them, especially in a mass media technology environment.

It is noted that some conventional systems and methods exist for assessing a mental state of a person, but these systems and methods have certain drawbacks.

In one conventional system, a device is provided for estimating a mental decision. This estimate is performed by monitoring a subject's gaze direction along with the subject's EEG, and by processing the output signals via a neural network to classify an event as a mental decision to select a visual cue. Thus, the device can detect when a subject has decided to look at a visual target. The EEG is detected via skin sensors placed on the head.

In a second conventional method and system, a person's emotional state is determined remotely. Such a technique is performed by broadcasting a waveform of predetermined frequency and energy at an individual, and then detecting and analyzing the emitted energy to determine physiological parameters. The physiological parameters, such as respiration, blood pressure, pulse rate, pupil size, perspiration levels, etc. are compared with reference values to provide information indicative of the person's emotional state.

In yet another conventional system, a method is provided for evaluating a subject's interest level in presentation materials by analyzing brain-generated event related potential (ERP) and/or event related field (ERF) waveforms. Random audio tones are presented to the subject followed by measurement of ERP signals. The level of interest is computed from the magnitude of the difference of a baseline ERP signal and an ERP signal during a task (e.g., during a video presentation). The difference is correlated to the interest level which the subject expressed by filling out a questionnaire about the video presentations. ERP measurement requires scalp sensors and although it has been suggested that using EMF signals would allow such a technique to be performed non-intrusively, no evidence or practical implementation is known which makes possible such non-intrusive activity.

In other work, it has been determined that perplexed behaviors of a subject using a word processor resulted in head motion changes more than facial expression changes. Dynamic programming is employed to match head motion with head motion templates of the following head gestures: nod, shake, tilt, lean backwards, lean forwards, and no movement. When the subject (user) displays appropriate head gestures, it can be detected when the person is perplexed.

However, in the above technique, only perplexed behaviors, not a general level of interest, was detected.

Other experiments have been performed which indicate that people naturally lean forward when presented positive valence information. In one experiment, a mouse with a trackpoint was used and the forward pressure on the trackpoint was measured and then correlated with the valence level of presented information.

No methods or systems exist for assessing and communicating a person's level of interest in real-time by passively observing them, especially in a mass media technology environment.

SUMMARY OF THE INVENTION

In view of the foregoing and other problems of the conventional methods and systems, an object of the present invention is to reliably assess and communicate a subject's interest level to media content and more particularly to assessing a subject's level of interest in realtime by passively observing the subject.

Another object of the present invention is to provide a non-intrusive method of detecting interest level whereas the prior art has required intrusive detection or detects only emotional information but not the level of the subject's interest in the information.

In a first aspect of the present invention, a system and method are provided for unobtrusively detecting a subject's level of interest in media content, which includes means for detecting to what a subject is attending; means for measuring a subject's relative arousal level; and means for combining arousal level and attention to produce a level of interest.

Thus, the system and method assess whether a person is attending to the target information (e.g., such as media content). For example, if the person is not attending to the information, the person is assumed to be not interested in the information at that time. Attention can be assessed in various ways depending on the particular medium. In visual media, for example, people reliably attend to the visual information to which their gaze is directed. Therefore, devices that determine at which target a person is looking, such as eye trackers or the like, can be used for attention detection in the visual media.

Furthermore, it has been shown that the duration of fixation time is a strong cue of indicated interest. People gaze at things longer when they are interested in them. It is noted that "target information" is defined as the object of attention or any object a person could attend to and a level of interest could be assessed.

Next, a person's relative arousal level is assessed. If a person is more aroused when they attend to target information, the person is assumed to find that information interesting at that time. Arousal in this case is a general affective state and can be assessed in various ways. For example, in interpersonal communication, speakers use facial expression as a means of assessing arousal and consequently interest. Therefore, devices that determine a person's arousal level, such as facial gesture detectors, can be used to assess arousal.

Finally, by combining data about attention and arousal, the method and system according to the present invention assesses the level of interest a person has in a particular information target (media content). This assessment can then be communicated as feedback about the information target (media content).

With the invention, a subject's level of interest in information presented to the subject can be reliably and unobtrusively assessed in realtime.

In another aspect of the invention, a method for detecting a person's level of interest in presented target information, includes assessing whether a person is attending to the target information, to produce first data; assessing a person's relative arousal level with regard to the target information, to produce second data; combining the first and second data to determine a level of interest the person has in the target information; and communicating the level of interest as feedback about the target information to a manager of the target information.

Finally, in yet another aspect of the invention, a signal medium is provided for storing programs for performing the above methods.

For example, in a first signal-bearing medium tangibly embodying a program of machine-readable instructions executable by a digital processing apparatus to perform a method for computer-implemented unobtrusive detection of a subject's level of interest in media content, the method includes detecting to what a subject is attending; measuring a subject's relative arousal level; and combining arousal level and attention to produce a level of interest.

In a second signal-bearing medium tangibly embodying a program of machine-readable instructions executable by a digital processing apparatus to perform a method for computer-implemented unobtrusive detection of a subject's level of interest in media content, the method includes assessing whether a person is attending to the target information, to produce first data; assessing a person's relative arousal level with regard to the target information, to produce second data; combining the first and second data to determine a level of interest the person has in the target information; and communicating the level of interest as feedback about the target information to a manager of the target information.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
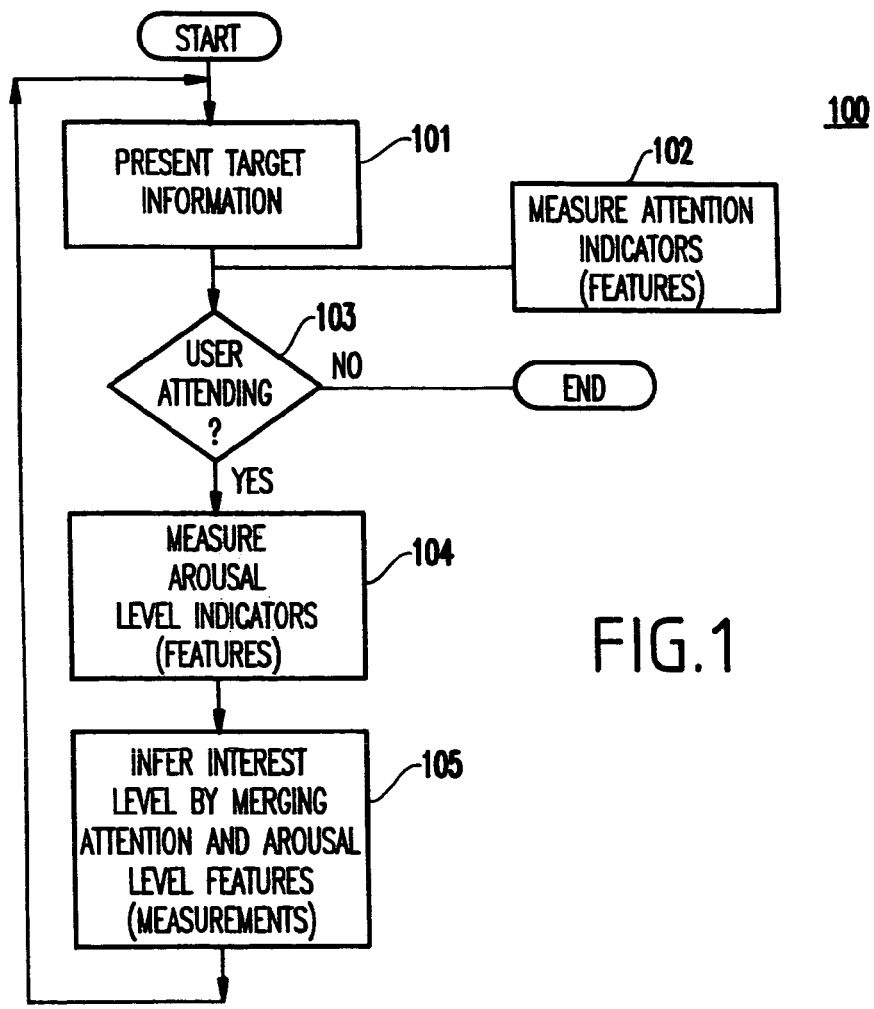
FIG. 1 illustrates a flow diagram of the method of operation of the present invention.

Referring now to the drawings, and more particularly to FIGS. 1–6, there is shown a preferred embodiment of the present invention.

First, as shown in the flow diagram of FIG. 1, there are four main steps (e.g., steps 102, 103, 104, 105) for implementing the method 100 of assessing a subject's interest in media content according to the present invention.

First, in step 101, information is presented.

In step 102, the attention indicators (features) of the subject are measured.

In step 103, it is determined whether the subject is attending to target information based on the attention indicators/features measured in step 102. In determining what the subject is attending, preferably the subject's gaze is tracked. There are many methods to track gaze, and for example, many methods are described in Young et al., "Methods and Designs: Survey of Eye Movement Recording Methods", *Behavior Research Methods and Instrumentation*, Vol 7, pp. 397–429, 1975. Since it is desirable to observe gaze unobtrusively, preferably a remote camera-based technique is employed such as the corneal glint technique taught in U.S. Pat. No. 4,595,990 to Garwin et al. entitled, "Eye Controlled Information Transfer" and further refined in U.S. Pat. Nos. 4,536,670 and 4,950,069 to Hutchinson.

Instead of custom-built eye/gaze trackers, commercially available systems, such as the EyeTrac® Series 4000 product by Applied Science Labs, Inc. and the EyeGaze® system by LC Technologies, Inc. can be implemented with the invention.

An improvement on the commercial systems that allows for more head motion uses a novel person detection scheme that uses optical properties of pupils, as described in "Pupil Detection and Tracking Using Multiple Light Sources", by Morimoto et al., *IBM Research Report RJ* 10117, April, 1998, incorporated herein by reference, in Ebesawa et al., "Unconstrained Pupil Detection Technique Using Two Light Source and the Image Differencing Method", *Visualization and Intelligent Design Architecture*, pp. 79–89, 1995, and in U.S. Pat. No. 5,016,282 issued to Tomono et al. (also published in Tomono et al., "A TV Camera System Which Extracts Feature Points For Non-Contact Eye Movement Detection", SPIE, Vol 1194, *Optics Illumination and Image Sensing for Machine Vision IV*, 1989.

By finding the person by, for example, using a relatively wide field lens, the high resolution tracking camera can be targeted and avoid getting lost during large fast head and upper body motions. The output of the gaze tracker can be processed to give sets of fixations. This operation can be performed as described in Nodine et al., "Recording and Analyzing Eye-Position Data Using a Microcomputer Workstation", *Behavior Research Methods, Instruments & Computers*, 24:475–485, 1992, or by purchasing commercial packages such as the EYEANAL® from Applied Science Labs, Inc. The gaze-tracking device may be built into a display to which the person is gazing or may be provided separately from the display.

The fixation locations are mapped to applications/content on a screen/television monitor or object in a 3-D environment. The durations (e.g., as measured by a timer provided either separately or built into a CPU) are used to rank the fixation to signal the strength of attention level. A longer fixation indicates a higher attention level. In a room setting, the gaze vector can be used along with a 3-D model of the room to determine what object the subject is looking at. Once it is known at which object the subject is looking, the subject's level of attention toward that object, as well as the subject's history of attention to various objets, can be determined. Additionally, it is known what target information the subject has not yet seen, and thus interest level of those targets cannot be assessed.

The next step is to measure and assess the subject's relative arousal level (e.g., step 104). Specifically, in step 104, if the subject is attending to the target information, then the subject's arousal level must be measured.

Here, for example, the technique of analyzing facial gestures from video sequences is employed. Hence, an arousal-level assessment means may be employed. For example, as described in Ekman et al., "Unmasking the Face", Prentice-Hall: Englewood Cliffs, N.J. (1971), incorporated herein by reference, a system of coding facial expressions has been used to characterize human emotions. Using this system, human emotions such as fear, surprise, anger, happiness, sadness and disgust can be extracted by analyzing facial expressions. Computer vision researchers have recently codified the computation of these features, as described for example, in Black et al., "Recognizing Facial Expressions in Image Sequences using Local Parameterized Models of Image Motion", *International Journal of Computer Vision*, 25 (1) (1), pp. 23–48, 1997, C. Lisetti et al., "An Environment to Acknowledge the Interface Between Affect and Cognition", *AAAI, Tech report SS*-98-2, pages 78-86, 1998, J. Lien et al., "Automated Facial Expression Recognition based on FACS Action Units", *Proceeding of the FG '98*, IEEE, April 1998, Nara Japan, J. Lien et al., "Automatically Recognizing Facial Expression in the Spatio-Temporal Domain", *Workshop on the Perceptual User Interfaces, pp* 94-97 Banaff, Canada, October 1997, J. Lien et al., "Subtly Different Facial Expression Recognition and Expression Intensity Estimations", *Proceedings of CVPR '98*, IEEE, Santa Barbara, June 1998, and I. Essa et al., "A Vision System For Observing and Extracting Facial Action Parameters", *Proceedings of CVPR '94*, IEEE, pp 76–83, 1994, all of which are incorporated herein by reference.

Additionally, as another or alternative arousal-level assessment mechanism, by observing head gestures such as approval/disapproval, nods, yawns, blink rate/duration, and pupil size and audio utterances, a measure of the arousal level of the subject at the current time can be obtained. For example, decreasing blink rate and increasing blink duration is a strong indicator that the subjects is falling asleep, and thus has a low arousal level. This type of detection has been used to detect the onset of sleep in drivers of cars, as described in M. Eriksson et al., "Eye Tracking for Detection of Driver Fatigue", *IEEE Conference on Intelligent Transportation Systems*, 1997, pp. 314–319, and M. Funada et al., "On an Image Processing of Eye Blinking to Monitor Awakening Levels of Human Beings", Proceedings of IEEE 18$^{th}$ International Conference in Medicine and Biology, Vol. 3, pp. 966-967, 1996, incorporated herein by reference, and U.S. Pat. No. 5,786,765 to Kumakura et al., incorporated herein by reference. In contrast, multiple approval nods are a strong indication that the subjects are alert and interested.

It is noted that, in the exemplary implementation, speech is not integrated, for brevity and ease of explanation. However, it is noted that speech content and vocal prosody can be used to help decide a person's affective station. Expression like "yeah", "right" etc. indicate strong interest, whereas expressions like "blah", "yuck" etc. indicate strong disinterest. As noted in R. Banse et al., "Acoustic Profiles in Vocal Emotion Expression", *Journal of Personality and Social Psychology*, 70, 614-636, (1997), vocal characteristics, such as pitch, can indicated levels of arousal. Such speech content and vocal prosody could be integrated into the arousal assessment means according to the present invention, either additionally or alternatively to the arousal assessment mechanisms discussed above.

Blink rate can be measured by simply analyzing the output of the pupil detection scheme, as described in C. Morimoto et al., "Pupil Detection and Tracking Using Multiple Light Sources", *IBM Research Report RJ* 10117, April, 1998. Whenever both pupils disappear, a blink is marked and the duration is measured. The blink rate is computed by simply counting the last few blinks over a period of time and dividing by the time. A decreasing blink rate and increasing blink duration is a strong indicator that the subject is falling asleep and thus has a low arousal level.

Upper body motion can be detected by analyzing the motion track of the pupil over time. To extract this information, as taught by T. Kamitaini et al., "Analysis of Perplexing Situations in Word Processor Work Using Facial Image Sequence", *Human Vision and Electronic Imaging II, SPIE vol* 3016, 1997 pp. 324-334. The present invention computes x, y, z and tilt angle of the head by simple analysis of the pupils' centers. The motion in x and y is computed using a finite difference of the left and right pupil center averages. A motions in the z axis can be obtained using finite differences on the measured distance between the pupils. The tilt angle motion can be computed using finite differences on the angle between the line connecting the pupils and a horizontal line.

Then, a distance between the gesture is computed using dynamic programming to the following templates: yes nod, no nod, lean forward, lean backward, tilt and no action. The output of this stage are 6 distances to the 6 gestures. These distances is computed over the previous 2 seconds worth of data and updated each frame.

To extract information from facial gestures, the eyebrow and mouth region of the person's face are examined. The pupil finding technique indicates a location of the pupils of a person. From this information and a simple face model, regions of the eyebrows and the region of the lips are extracted. For example, pitch may indicate "yes", a yaw motion may indicate "no", and a roll may indicate "I don't know".

Figure 2:
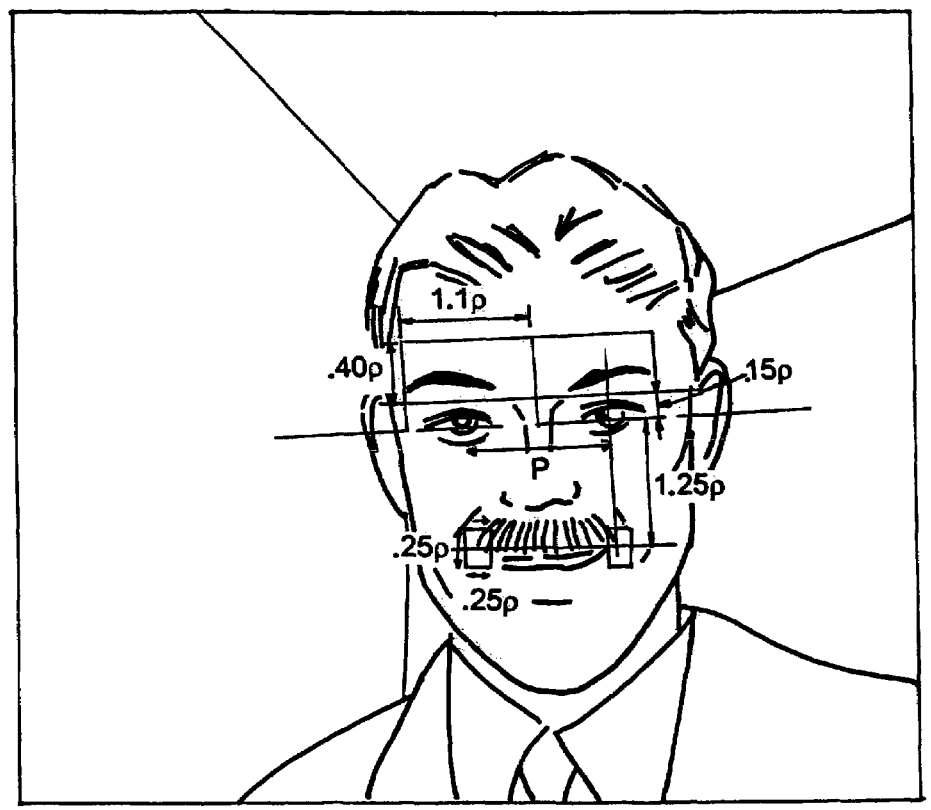
FIG. 2 illustrates a practical example of implementing the method of the present invention.

To identify the eyebrows, two rectangular regions are extracted using the line connecting the two pupils, as shown in FIG. 2. Aligning the rectangles to the line connecting the pupils allows for side to side head rolling (e.g., an "I don't know" gesture movement) and establishes an invariant coordinate system. The regions are thresholded to segment the eyebrows from the underlying skin. The coordinates of the inside (medial) and outside (temporal) point of the largest blob (connected region are found and the perpendicular distance between these points and the baseline are computed. The distance between the eyes and the eyebrows indicates the extent to which the eyebrows are raised (e.g., as in an expression of surprise) or lowered (e.g., as in an expression of anger or confusion) along the mid-line of the face. This expression occurs through the combined action of the corrugator supercilii and medial frontalis muscles.

To allow for invariance to up and down rotation (e.g., a "yes" gesture movement), the ratio of the distances are computed. The muscles of the face only act on the medial point. The temporal point remains fixed on the head, but the distance will change due to perspective from up/down head rotation. The ratio of the distances reflects changes due to the medial point from face muscles and not head motion.

To identify the mouth, the mouth is found again by using the coordinate system aligned to the lines between the pupils. Here, a corner of the mouth is found. This is done by searching for corners using a corner detection scheme. Here, the eigenvalues of the windowed second moment matrix is found, as outlined on pages 334–338 of R. Haralick, "Computer and Robot Vision", Vol. 2, Addison Wesley, 1993), incorporated herein by reference. Then the perpendicular distance between the mouth corner and the baseline between the pupils is computed. This distance indicates the extent to which the subject is smiling (e.g., as in an expression of happiness) or frowning (e.g., as in an expression of sadness). This expression occurs through the action of the zygomatic muscle.

In summary, the features extracted are as follows: what the subject is looking at, the subject's blink rate and blink duration, six distances to six head gestures, the relative position of his eyebrows, and the relative position of the corners of his mouth.

The next step (e.g., step 105) is to infer the subject's interest level from these features (or measurements). The preferred method for this purpose is a Bayesian network which is sometimes called a "belief network". Other machine learning techniques, such as decision trees and neural networks can also be used. However, Bayesian networks offer several advantages in handling missing data (features), learning and explaining causal relationship between various attributes including features, incorporating expert knowledge, and avoiding over-fitting of data.

A Bayesian network is an acyclic-directed graph (without any loops) in which nodes represent variables and arcs represent cause-effect relationship (e.g., an arc from node a to b indicates that variable a is a direct cause for variable b). Each node is associated with a conditional probability distribution $P(x_i|\Pi_i)$, where $\Pi_i$ denotes the parents of the node variable $x_i$. The strength of the causal relationship is encoded in this distribution. A beneficial property of Bayesian networks is that the joint probability distribution encoded in the network can be computed by the product of all the conditional probability distributions stored in its nodes. If a node has no parents, then the conditional variable is empty.

Figure 3:
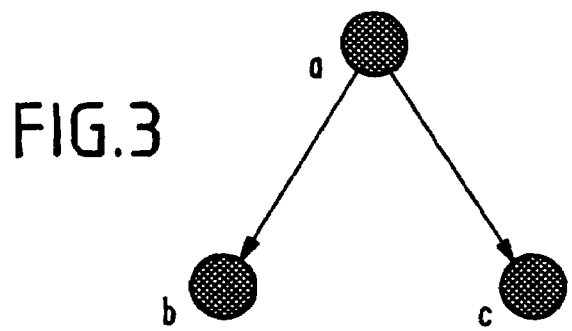
FIG. 3 illustrates a simple Bayesian network with a plurality of variables, a, b, and c.

For example, FIG. 3 shows a simple Bayesian network with three variables, a, b and c. Variable a is the parent of both b and c, which says that both b and c depend on a, but b and c are conditionally independent given a. The joint probability $P(a, b, c)=P(a)P(b|a)P(c|a)$.

Once a Bayesian network is built, one can issue a number of queries. For example, given a set of observations (e.g., often-called "evidence") on the states of some variables in the network, one can infer the most probable state(s) for any unobserved variable(s). This applies to the problem of inferring a subject's interest level given the observations on subject's gaze fixation density, blink rate and duration, head movement, body movement, and facial expression (e.g., eyebrows distance and mouth distance). It is noted that the fixation density is the number of fixation per unit time (seconds) per window. A "window" is a fixed portion of a display screen (e.g., typically rectangular or square), but which typically has separate controls for sizing and the like. A typical window may have a 2-inch by 2-inch dimension, or the like. It is noted that it is unnecessary to have all the features in order to infer the subject's interest level. This is particularly desirable because some features may not be reliably obtained under certain circumstances.

Figure 4:
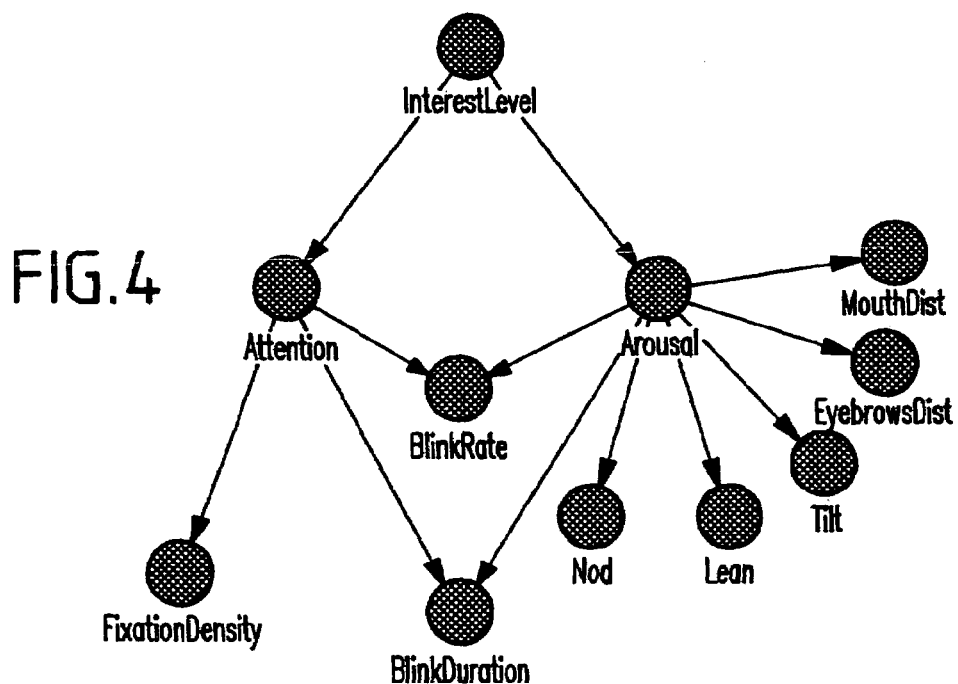
FIG. 4 illustrates a Bayesian network for inferring a subject's interest level.

FIG. 4 shows a Bayesian network for inferring a subject's interest level. It consists of 11 variables. Among them, eight are observable (FixationDensity, BlinkRate, BlinkDuration, Nod, Lean, Tilt, EyebrowsDistance, and MouthDistance), two are hidden variables (Attention and Arousal), and InterestLevel is the variable to be inferred. The dependency information among these variables are represented by the arcs. Attention and Arousal are the direct indicators for subject's interest level. The Attention level in turns affects the FixationDensity, BlinkRate, and BlinkDuration. Similarly, the Arousal level affects BlinkRate, BlinkDuration, Nod, Lean, Tilt, EyebrowsDistance, and MouthDistance, as discussed earlier. It is noted that some features are represented as states of a variable in this model. For example, the variable Nod has three states: yes, no, and no-action, and variable Lean also has three states: forward, backward, and no-action.

The structure and parameters of a Bayesian network can be learned from experimental data using the algorithms described in D. Heckerman, "A Tutorial on Learning with Bayesian Network", *MSR-TR*-95-06, and E. Castillo et al., "Expert Systems and Probabilistic Network Models", Springer, 1998. Bayesian networks have been used for performing collaborative filtering (e.g., see U.S. Pat. No.

5,704,017, incorporated herein by reference), and probabilistic subject modeling based on a subject's background, actions, and queries (e.g., see E. Horvitz et al., "The Lumiere Project: Bayesian User Modeling for Inferring the Goals and Needs of Software Users", *Proc. of the 14th Conference on Uncertainty in Artificial Intelligence.* Madison, Wis. July, 1998).

One use of this system is for an information presentation (media content) technology to receive interest level data about various information targets, and then present more information that is similar to the targets that were most interesting and present less information that is similar to the targets that were least interesting. It is noted that the present invention may utilize other classification schemes instead of the above-described scheme.

Figure 5:
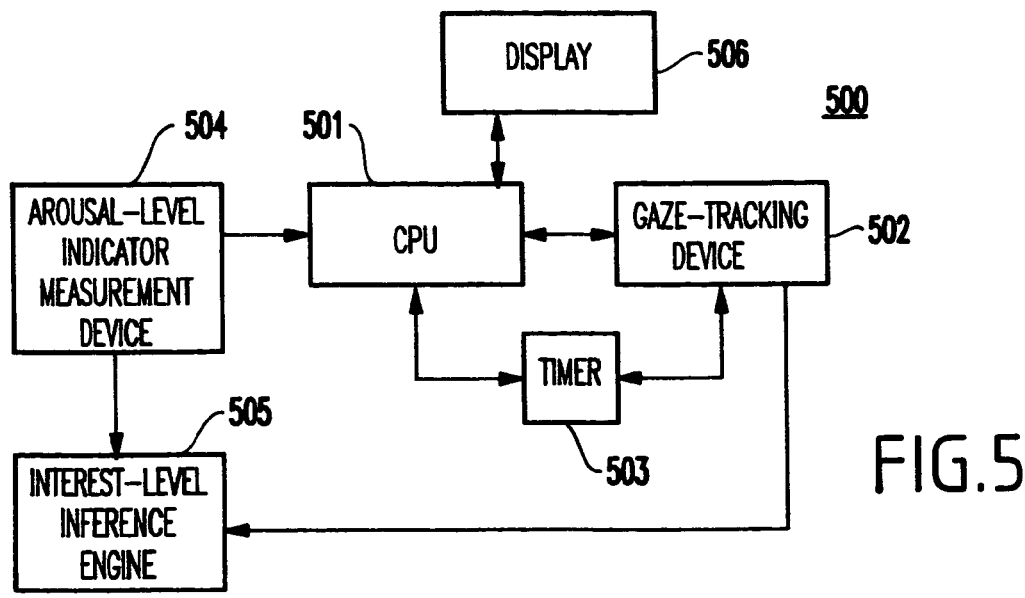
FIG. 5 illustrates a block diagram of the environment and configuration of a system 500 according to the present invention.

FIG. 5 shows a system 500 for performing the above operations. Preferably, system 500 includes a CPU 501, a gaze-tracking device 502, a timer 503 (which can be provided within CPU 501 or the gaze-tracking device 502), an arousal-level indicator measurement device 504, an interest-level inference engine 505, and a display 506. It is noted that the display 506 may be a room model or model of the area in which the subject is operating.

Figure 6:
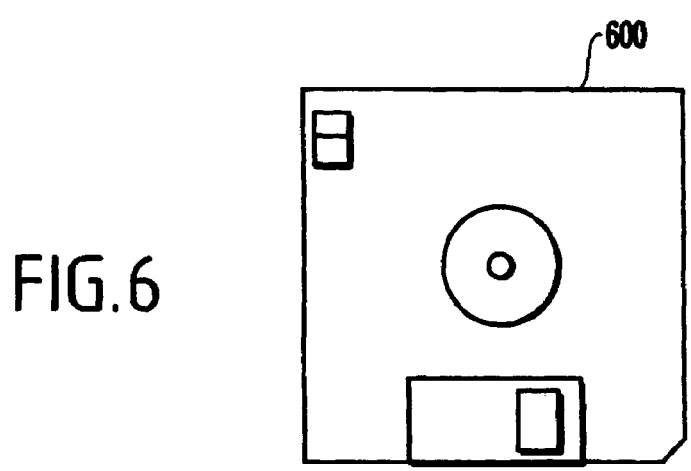
FIG. 6 illustrates a storage medium for storing steps of the program for unobtrusively detecting a level of interest a subject has to media content.

As shown in FIG. 6, in addition to the hardware and process environment described above, a different aspect of the invention includes a computer-implemented method for determining a level of interest a subject has in media content, as described above. As an example, this method may be implemented in the particular hardware environment discussed above.

Such a method may be implemented, for example, by operating the CPU 501 (FIG. 5), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 501 and hardware above, to perform a method of determining a person's interest to media content.

This signal-bearing media may include, for example, a RAM (not shown) contained within the CPU 501, as represented by the fast-access storage for example. Alternatively, the instructions may be contained in another signal-bearing media, such as a magnetic data storage diskette 600 (FIG. 6), directly or indirectly accessible by the CPU 501.

Whether contained in the diskette 600, the computer/CPU 501, or elsewhere, the instructions may be stored on a variety of machine-readable data storage media, such as DASD storage (e.g., a conventional "hard drive" or a RAID array)! magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the massive amount of digital information, all Internet-based information systems face the challenge of providing the subjects with quality information that is relevant to their individual personal interests. Hence, most existing systems demand (or at least strongly request) that subjects provide an explicit interest profile or explicit vote on individual web pages. Such activities put significant burdens on subjects, who want merely to get the best information with the least trouble in the quickest possible manner.

By integrating gaze-tracking with an arousal-level assessment mechanism and an information source (e.g., a display such as a ticker display), the system according to the present invention can automatically collect valuable feedback passively, without requiring the subject to take any explicit action such as completing a survey form, undergoing a registration process, or the like.

Using the same techniques described previously for determining whether to display more relevant information to a subject, the system generates relevance feedback based on whether the subject is paying attention to certain display items. Accordingly, the system "learns" the subject's particular interests, and the system adaptively provides information regarding such interests to the subject.

A key advantage of this approach is that the system may have different levels of confidence in the subject's interests in a certain topic because it provides different levels of details for any display item. Thus, the system is adaptive to the subject's interests, and stores information broadly representing the subject's interests in a database or the like. Similarly, negative feedback can also be noted in the subject's profile, and, eventually the subject's display will display mainly items of information in which the subject has a high interest.

While the invention has been described in terms of a preferred embodiment, those skilled in the art will recognize that the invention can be practiced with modification within the spirit and scope of the appended claims.

What is claimed is:

1. A system for unobtrusively detecting a subject's level of interest in media content, comprising:
   means for detecting a subject's attention to said media content;
   means for measuring said subject's relative arousal level; and
   means for determining said level of interest based on information regarding said subject's arousal level and said subject's attention to said media content,
   wherein said means for determining said level of interest adaptively infers said level of interest.

2. The system according to claim 1, wherein said detecting means includes means for determining a target to which a gaze of the subject is directed.

3. The system according to claim 2, wherein said determining means further includes means for determining a duration of fixation time of said gaze.

4. The system according to claim 3, wherein said measuring means includes means for determining whether the subject is attending to the media content.

5. The system according to claim 4, wherein said measuring means further includes means for measuring the subject's facial gestures.

6. The system according to claim 5, wherein said measuring means further includes means for measuring the subject's head gestures.

7. The system according to claim 6, wherein said measuring means further includes means for measuring the subject's speech.

8. The system according to claim 1, wherein said measuring means includes means for measuring the subject's facial gestures.

9. The system according to claim 1, wherein said measuring means includes means for measuring the subject's head gestures.

10. The system according to claim 1, wherein said measuring means includes means for measuring the subject's speech.

11. The system according to claim 1, wherein said level of interest produced provides relevance feedback associated with said subject to a manager of said media content.

12. The system according to claim 1, wherein said determining means uses a Bayesian Belief Network to determine said level of interest.

13. The system according to claim 1, wherein said determining means uses at least one of a Bayesian Belief Network, a decision tree and a neural network to determine said level of interest.

14. The system according to claim 1, wherein said determining means comprises a means for adaptively learning said subject's level of interest in said media content.

15. The system according to claim 1, wherein said detecting means outputs information regarding said subject's attention to said determining means, and said measuring means outputs said subject's arousal level to said determining means.

16. The system according to claim 1, wherein said measuring means measures said subject's arousal level after said detecting means detects said subject's attention.

17. The system according to claim 1, wherein said system comprises an information presentation technology system in which more information is presented regarding media content corresponding to a high level of interest and less information is presented regarding media content corresponding to a low level of interest.

18. A system for unobtrusively detecting an object of a subject's interest in media content, comprising:
means for detecting an object of said subject's attention;
means for measuring the subject's relative arousal level; and
means for determining said level of interest based on information regarding said subject's arousal level and said subject's attention to said media content,
wherein said means for determining said level of interest adaptively infers said level of interest.

19. The system according to claim 18, wherein said detecting means includes means for determining a target to which a gaze of the subject is directed.

20. The system according to claim 19, wherein said determining means further includes means for determining a duration of fixation time of said gaze.

21. The system according to claim 20, wherein said measuring means includes means for determining whether the subject is attending to the media content.

22. The system according to claim 21, wherein said measuring means further includes means for measuring the subject's facial gestures.

23. The system according to claim 22, wherein said measuring means further includes means for measuring the subject's head gestures.

24. The system according to claim 23, wherein said measuring means further includes means for measuring the subject's speech.

25. The system according to claim 18, wherein said measuring means includes means for measuring the subject's facial gestures.

26. The system according to claim 18, wherein said measuring means includes means for measuring the subject's head gestures.

27. The system according to claim 18, wherein said measuring means includes means for measuring the subject's speech.

28. The system according to claim 18, wherein said level of interest produced provides relevance feedback associated with said subject to a manager of said media content.

29. A method of unobtrusively detecting a subject's level of interest in media content, comprising:
detecting a subject of said subject's attention;
measuring a subject's relative arousal level; and
determining said level of interest based on information regarding said subject's arousal level and said subject's attention to said media content,
wherein said determining said level of interest comprises adaptively inferring said level of interest.

30. The method according to claim 29, wherein said detecting includes determining a target to which a gaze of the subject is directed.

31. The method according to claim 30, wherein said determining further includes determining a duration of fixation time of said gaze.

32. The method according to claim 31, wherein said measuring includes determining whether the subject is attending to the target information.

33. The method according to claim 32, wherein said measuring further includes measuring the subject's facial gestures.

34. The method according to claim 33, wherein said measuring further includes measuring the subject's head gestures.

35. The method according to claim 34, wherein said measuring further includes measuring the subject's speech.

36. The method according to claim 29, wherein said measuring includes measuring the subject's facial gestures.

37. The method according to claim 29, wherein said measuring includes measuring the subject's head gestures.

38. The method according to claim 29, wherein said measuring includes measuring the subject's speech.

39. The method according to claim 29, wherein said level of interest produced provides relevance feedback associated with said subject to a manager of said media content.

40. A method of unobtrusively detecting the object of a subject's interest in media content, comprising:
detecting the object of said subject's attention;
measuring the subject's relative arousal level; and
determining said level of interest based on information regarding the subject's arousal level and said subject's attention to said media content,
wherein said determining said level of interest comprises adaptively inferring said level of interest.

41. The method according to claim 40, wherein said detecting includes determining a target to which a gaze of the subject is directed.

42. The method according to claim 41, wherein said determining further includes determining a duration of fixation time of said gaze.

43. The method according to claim 42, wherein said measuring includes determining whether the subject is attending to the target information.

44. The method according to claim 43, wherein said measuring further includes measuring the subject's facial gestures.

45. The method according to claim 44, wherein said measuring further includes measuring the subject's head gestures.

46. The method according to claim 45, wherein said measuring further includes measuring the subject's speech.

47. The method according to claim 40, wherein said measuring includes measuring the subject's facial gestures.

48. The method according to claim 40, wherein said measuring includes measuring the subject's head gestures.

49. The method according to claim 40, wherein said measuring includes measuring the subject's speech.

50. The method according to claim 40, wherein said level of interest produced provides relevance feedback associated with said subject.

51. A method for detecting a person's level of interest in media content, comprising:
assessing whether a person is attending to the media content, to produce first data;
assessing a person's relative arousal level with regard to the media content, to produce second data;
determining said level of interest in said media content based on said first and second data; and
communicating said level of interest as feedback about the media content to a manager of said media content,
wherein said determining said level of interest comprises adaptively inferring said level of interest.

52. The method according to claim 51, wherein said assessing includes determining a target to which a gaze of the person is directed.

53. The method according to claim 52, wherein said assessing further includes determining a duration of fixation time of said gaze.

54. The method according to claim 51 wherein said assessing includes determining whether the person is attending to the media content.

55. The method according to claim 51 wherein said assessing includes measuring a person's facial gestures.

56. The method according to claim 51 wherein said assessing includes measuring the person's head gestures.

57. The method according to claim 51 wherein said assessing includes measuring the subject's speech.

58. The method according to claim 51 wherein said level of interest produced provides relevance feedback associated with said subject.

59. A signal-bearing medium tangibly embodying a program of machine-readable instructions executable by a digital processing apparatus to perform a method for computer-implemented unobtrusive detection of a subject's level of interest in media content, said method comprising:
detecting an object of said subject's attention;
measuring a subject's relative arousal level; and
determining said level of interest based on information regarding said subject's arousal level and said subject's attention,
wherein said determining said level of interest comprising adaptively inferring said level of interest.

60. A signal-bearing medium tangibly embodying a program of machine-readable instructions executable by a digital processing apparatus to perform a method for computer-implemented unobtrusive detection of a subject's level of interest in media content, said method comprising:
assessing whether a subject is attending to the media content, to produce first data;
assessing a subject's relative arousal level with regard to the media content, to produce second data;
determining said level of interest in said media content based on said first and second data; and
communicating said level of interest as feedback about the media content to a manager of said media content,
wherein said determining said level of interest comprises adaptively inferring said level of interest.

61. A system for unobtrusively measuring a subject's interest in media content, comprising:
a detector for detecting a subject's attention to said media content;
a measuring device which measures a subject's arousal level; and
an inference engine which infers subject's interest level based on information regarding said subject's arousal level and said subject's attention to said media content,
wherein said inference engine adaptively infers said interest level.

62. The method according to claim 59, wherein said physical attribute of said subject includes at least one of a facial gesture, a head gesture, a blink rate and blink duration, a relative position of an eyebrow, and a relative position of a mouth corner.

63. The method according to claim 62, wherein said physical attribute of said subject further includes at least one of an audio utterance, a gaze fixation density, a pupil size, upper body movement.

64. The method according to claim 62, wherein additional media content is provided in real time to said subject based upon the inferred level of interest.

65. The method according to claim 60, wherein said physical attribute of said subject includes at least one of a facial gesture, a head gesture, a blink rate and blink duration, a relative position of an eyebrow, and a relative position of a mouth corner.

66. The method according to claim 65, wherein said physical attribute of said subject further includes at least one of an audio utterance, a gaze fixation density, a pupil size, and an upper body movement.

67. The method according to claim 65, wherein additional media content is provided in real time to said subject based upon the inferred level of interest.

* * * * *